United States Patent [19]

von der Heide

[11] 4,042,863
[45] Aug. 16, 1977

[54] INCREMENTALLY CONTROLLABLE MOTOR DRIVE SYSTEM

[75] Inventor: Johann von der Heide, St. Georgen, Germany

[73] Assignee: Papst-Motoren KG, St. Georgen, Germany

[21] Appl. No.: 620,912

[22] Filed: Oct. 9, 1975

[30] Foreign Application Priority Data

Oct. 10, 1974 Switzerland .................. 13537/74
Feb. 11, 1975 Switzerland .................. 1655/75

[51] Int. Cl.² .............................................. G05B 1/06
[52] U.S. Cl. ............................... 318/254; 318/640;
318/439; 318/696; 250/237 R
[58] Field of Search .............. 318/685, 696, 254, 138,
318/439, 602, 673, 640, 602, 672; 250/237 R

[56] References Cited

U.S. PATENT DOCUMENTS

| | | | |
|---|---|---|---|
| 3,324,685 | 1/1967 | Schmidt et al. | 318/163 |
| 3,327,499 | 6/1967 | Schmidt et al. | 318/163 |
| 3,541,418 | 11/1970 | Agin et al. | 318/685 |
| 3,708,681 | 1/1973 | Ivers | 318/640 |
| 3,766,459 | 10/1973 | McIntosh et al. | 318/685 |
| 3,784,888 | 1/1974 | Geiersbach et al. | 318/138 |
| 3,800,204 | 3/1974 | Kenney | 318/480 |
| 3,889,169 | 6/1975 | Hirschman et al. | 318/618 |
| 3,924,167 | 12/1975 | Clark et al. | 318/138 |
| 3,924,268 | 12/1975 | McIntosh et al. | 318/617 |
| 3,940,677 | 2/1976 | Morino et al. | 318/685 |

*Primary Examiner*—Robert K. Schaefer
*Assistant Examiner*—John J. Feldhaus
*Attorney, Agent, or Firm*—Michael J. Striker

[57] ABSTRACT

The motor is to be controlled to execute steps having a preselected step length. A displacement transducer is coupled to the motor and furnishes a displacement signal having a constant first predetermined value during motor movement by a predetermined fraction of said step length and changes to a second predetermined value during motor movement by the remainder of the step length. A voltage divider circuit and a differentiator circuit are connected to the output of the transducer and furnish a proportional and a differentiated signal. The two signals are combined in an operational amplifier whose output serves as a control signal for controlling the operation of the motor. The transducer includes three light transmitter-receiver pairs which are switched on in a first sequence when the motor rotates in one direction and in a second sequence for rotation in the opposite direction. The light passing from each transmitter to receiver is controlled by a diaphragm which has a pattern comprising a light transmissive portion extending for half a step length, a light transmissive to light blocking transition extending over a full step and a light blocking portion extending over a half a step. All the light receivers are tied together at a common point and a selector circuit selectively energizes the transmitter-receiver pairs so that each furnishes a partial signal which, when added to the other partial signals forms the complete displacement signal. The selector circuit is responsive to step initiating signals. If a monitoring circuit is provided to furnish "step performed" signals each indicative of a performed step and if these step performed signals are applied to the selector circuit to constitute the step initiating signals, then synchronism between the motor motion and the displacement transducer can be maintained and the motor can readily be switched from a position-uncontrolled to a position-controlled mode.

47 Claims, 13 Drawing Figures

INCREMENTALLY CONTROLLABLE MOTOR DRIVE SYSTEM

BACKGROUND OF THE INVENTION

The invention relates to an incrementally controllable drive with a motor located in a control system which can be stopped in predetermined positions, as a function of a speed signal and a displacement signal supplied by a displacement transducer.

In a known drive of this type (DOS No. 2,246,543) a transducer is provided for a signal corresponding to the particular speed and a transducer for a signal corresponding to the path length to be covered until the desired position is reached. A storage for the relationship between the permitted speed values and the path lengths to be covered before the terminal position is reached is associated with the path length transducer. A comparator is also provided which compares the signal for the particular speed with a signal for the maximum permitted speed and which supplies the motor with current corresponding to the result of this comparison.

The known arrangement is costly and therefore for this reason alone is eliminated from numerous applications. For example, in addition to the displacement transducer a separate speed transmitter, for example a tachogenerator must be provided. For determining the path length to be covered before the terminal position is reached, further relatively complicated and therefore costly arrangements are necessary.

SUMMARY OF THE INVENTION

Therefore, the object of the invention is to provide an incrementally controllable drive making it possible to accurately and rapidly pass from one to the next desired position without costly means and measures being necessary.

The present invention is a system for controlling a motor to execute steps each having a preselected step length. It comprises displacement transducer means coupled to said motor for furnishing a displacement signal having a constant first predetermined value during motor movement by a predetermined fraction of said step length and changing to a second predetermined value during motor movement by the remainder of said step length. It further comprises first proportional circuit means connected to said displacement transducer means for furnishing a proportional signal having an amplitude proportional to the amplitude of said displacement signal. Further comprised are differentiating circuit means connected to said displacement transducer means for differentiating said displacement signal and furnishing a differential signal corresponding to the so-differentiated displacement signal. Control signal furnishing means are also furnished which are connected to said proportional and differential circuit means for furnishing a control signal varying as a function of both said proportional and said differential signal. Finally, means are provided for applying said control signal to said motor to control the movement thereof.

During the constant first predetermined value of the displacement signal, the motor is accelerated under the influence of the proportional portion. As soon as the rising or falling portion of the displacement signal occurs after the predetermined fraction of the step the differential portion dominates and braking of the motor takes place. Subsequently the motor runs in controlled manner into the next desired position. The drive according to the invention can be realized with relatively simple means. Undesired oscillations about the rest position can be substantially avoided. The step positions are rapidly and precisely reached substantially independent of inertia.

The motor can be a normal linear rotary, preferably a two-phase synchronous motor, commutator motor or brushless direct current motor. By employing the principle according to the invention any such motor can in simple manner be operated as a step motor. The prerequisite is merely that the electrical time constant is kept small compared with the mechanical time constant.

If it is desired to selectively reverse the motor movement direction at least three partial signals (phases), staggered relative to one another by the step length can be generated by means of the displacement transducer, which partial signals during motor movement by a predetermined fraction of the step in a first or second direction respectively have a first or second substantially constant predetermined value, respectively, and during the remaining fraction of the step rise or fall from the first or second constant value to the second or first predetermined value. Furthermore, the sequencing of the displacement transducer partial signals is changed, in accordance with the direction of motor movement.

Preferably the ratio of the proportional portion and the differential portion is adjustable, making it possible to match the oscillating behavior of the drive to the particular operating conditions in an optimum manner.

As a further development of the invention, the control system is designed in such a way that the full accelerating voltage is applied to the motor before the particular displacement transducer partial signal being processed has reached its maximum or minimum value corresponding to the substantially constant level. Consequently the motor initially undergoes maximum acceleration when passing from one to the next desired position.

In order to keep the total time for the transfer between two successive desired positions particularly small the control system is preferably designed in such a way that after passing from the substantially constant level, that is the maximum or minimum value of the displacement transducer partial signal, to the linear portion of this signal the full braking voltage is applied to the motor until just before reaching the next desired position. Only the last path portion up to the next desired position is covered in a controlled manner. This circuitry also has the advantage that the power amplifier feeding the motor operates more as a switch than as an analog amplifier, so that power dissipation is relatively small.

Advantageously the displacement transducer is designed in such a way that the displacement transducer partial signals are adapted to a stepping operation of optimum speed, i.e. generally maximum speed.

As it can generally be assumed that the acceleration and braking of the motor take place with approximately the same time constant, the displacement transducer supplies constant values over a distance corresponding substantially to half the step. The acceleration and braking phases are of approximately the same length with such a design. As a result of this operation the next desired position is reached in an optimum short time.

Advantageously, it is ensured that the sides of the displacement transducer partial signals rise or fall in substantially linear manner as a function of distance covered. For special loading conditions, however, the shape of the displacement transducer partial signals can be adapted to the load in an optimum manner.

The displacement transducer is particularly inexpensive if it is constructed as an opto-electronic unit. It then has a diaphragm driven synchronously with the motor movement and which can be passed through the beam path between a light transmitter and a light receiver unit, whereby it is preferably interchangeable for the purpose of generating displacement signals for different step lengths.

If the diaphragm has a graduation corresponding at least to three times the step length, it can be universally used for step motor operation in one direction or another as well as for special cases in which the direction is reversible.

In the case of relatively large steps the beam path is advantageously slot or point-shaped and the diaphragm has repeating sequences of bright areas, neutral wedges becoming darker, dark areas and neutral wedges becoming brighter in the direction of movement. The bright and dark areas in each case extend over a zone approximately equal to half a step length, dependent on the number of phases, while the neutral wedges extend approximately over a full step length. It should be noted that "length" includes arc length as well as linear length.

In the case of relatively small steps a construction is suitable in which the beam path has a width corresponding to at least the step length and the diaphragm has alternating bright and dark areas in the direction of movement extending over a length corresponding substantially to ($m/2$) times the step wherein m is the number of partial signals produced by the displacement transducer or the phase number.

The displacement transducer can appropriately have a number of alternately selectable light transmitters corresponding to the number of partial displacement signals, with which can be associated a common or an individual light receiver. The first embodiment has only a single light receiver, but depending on the size of the step requires more or less costly optical elements for directing the light emitted by the individual light transmitters onto the common light receiver.

According to a modified embodiment, the displacement transducer is provided with a number of alternately selectable light receivers corresponding to the number of displacement transducer partial signals which cooperate with a common or several separate constantly light emitting transmitters.

The individual light transmitters and/or light receivers can cooperate with a common diaphragm track and can be spaced from one another, e.g. by one step in the track movement direction. It is also, however, possible for the individual light transmitters and/or receivers to cooperate each with its own diaphragm track. In both cases the number of steps can be varied simply by varying the diaphragm graduation. In a rotary motor a random number of steps per revolution can be set, provided that this number of steps can be integrally divided by the number of displacement transducer partial signals (phase number). In the first embodiment the reciprocal spacing of the light transmitter — light receiver pairs must be changed to change the number of steps.

If the motor used is a brushless DC motor with an electronic commutating circuit, a commutation can be particularly simply achieved in that the feed circuit of each motor phase is provided with an operational amplifier which can be switched from non-inverting to inverting operation as a function of the motor position.

Advantageously the displacement transducer and the arrangement determining the motor position for the commutation are combined into a single unit. When an optoelectronic displacement transducer is used, the displacement transducer diaphragm is provided with an additional commutation track, in a preferred embodiment of this invention.

For additional control measures it is advantageous to provide a monitoring circuit for furnishing step performed signals each indicative of a performed step. If these signals are used as step initiating signals for triggering of the next step, an automatically controlled step motor, i.e. a step motor requiring no external step commands is obtained with limited expenditures.

To extend the field of application of the drive, means are furnished that allow the drive to be switched over at random from position-controlled step motor operation to position-uncontrolled operation. During position-uncontrolled motor operation the displacement transducer is preferably furnished by the step performed signals synchronously with the motor movement. This permits the trouble-free transfer from position-uncontrolled to position-controlled operation at any time.

The monitoring circuit is appropriately designed in such a way that it emits the step performed signal after a predetermined fraction, e.g. approximately half of the particular step has been performed, so that optionally connected over-all controllers, for example, in the form of a counter, computer or processor have sufficient time to decide on whether further steps are to be performed or not.

For the purpose of providing position-controlled systems which make it possible to move within an extremely short time from a starting position to a target position, removed from the starting position by any arbitrary number of steps, according to a further development of the invention a switchover triggering stage is provided by means of which it is possible to bring about the transfer from position-uncontrolled to position-controlled operation. As a result, the motor can, in continuous operation, be allowed to run rapidly, e.g. at maximum power up to a position located at an appropriate distance from the target position after which the drive passes to position-controlled operation, during which the target position is selected with high target accuracy.

Preferably an overall controller, such as a computer, processor or counter is provided which brings about a reduction of the motor speed in position-uncontrolled operation before the switchover triggering stage operates.

At an appropriate distance from the target position the decision stage can switch the drive over from acceleration to braking and the switchover triggering stage can then operate on reaching a predetermined cut-off speed, then allowing the drive to continue running preferably for a few further steps in position-controlled operation until arrival at the target position is recognized and the drive is shut down. In such a case the step initiating and step performed signals can act on the switchover triggering stage, whereby operation can take place when the time between a step initiating and the associated step performed signal reaches a predetermined maximum value.

In accordance with a modified embodiment of the invention a speed regulator is provided by means of which in position-uncontrolled operation the drive can be regulated to a predetermined cut-off speed. With the construction the motor can run at the maximum available power from the starting position towards the target position until the overall controller brings about the transfer to the regulated cut-off speed. However, it is also possible to change the desired speed value of the speed regulator and regulate not only the cut-off speed but also the operating speed in position-uncontrolled operation by means of the speed regulator.

The actual speed signal necessary for the speed regulator can appropriately be derived by means of a frequency voltage transformer from the step performed signals.

The overall controller preferably also supplies the start and stop commands which cause the drive to leave the starting position or to stop in the target position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 7:
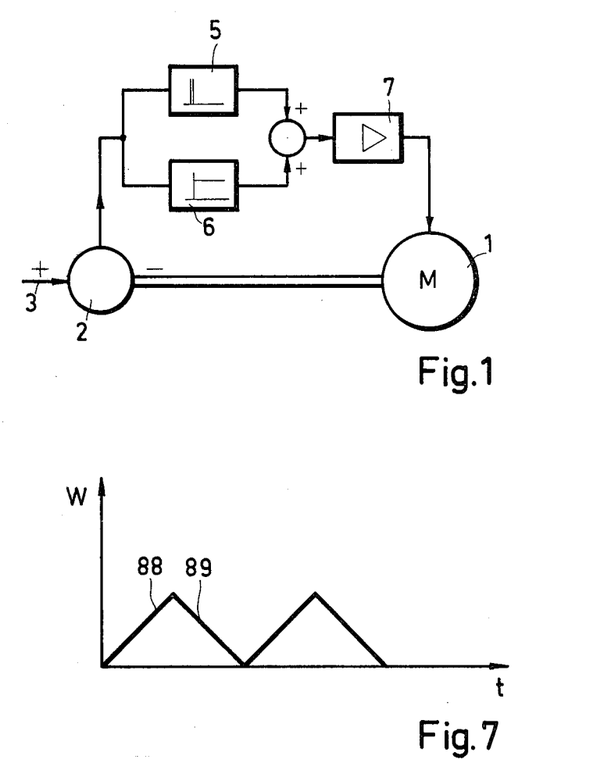
FIG. 1 is a schematic representation of a drive constructed according to this invention.
FIG. 7 graph of the angular velocity of the rotor as a function of time.

According to FIG. 1, the drive fundamentally has a motor 1 which is coupled to displacement transducer means 2. The displacement transducer means is supplied with step initiating signal at an input 3. In a manner to be described in greater detail hereinafter, it supplies partial signals staggered relative to one another and having a substantially constant level over a predetermined fraction of the step length followed by a rising or falling edge.

The displacement transducer means 2 is followed by a proportional stage 5 and a differential stage 6. These two stages derive a proportional signal and a differential signal from the output of the displacement transducer means. Via a power amplifier 7 motor 1 is subject to the action of a control signal formed by combining the proportional signal and the differential signal.

Figure 2:
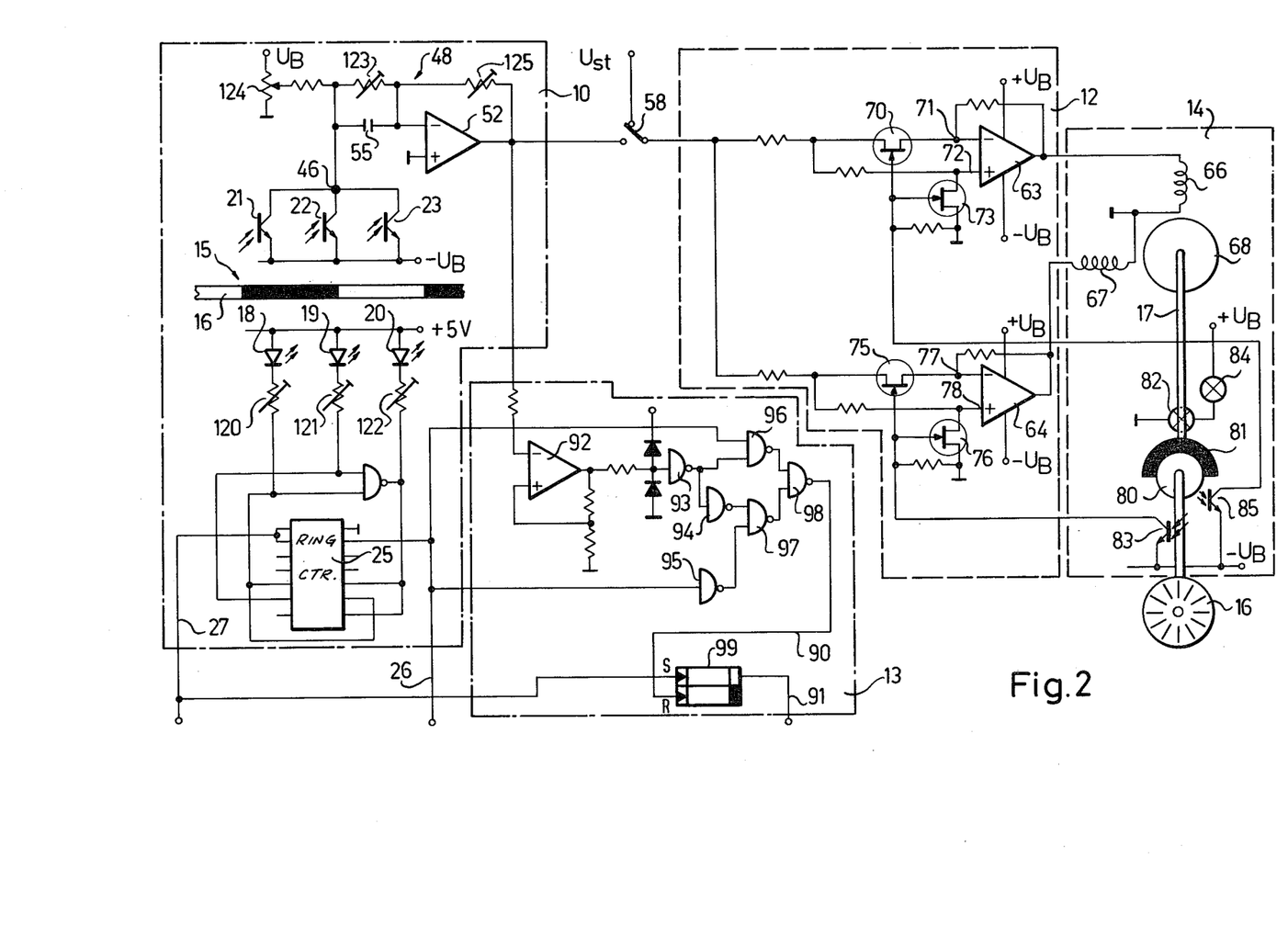
FIG. 2 is a circuit diagram of a preferred embodiment of the drive using a brushless DC motor.

In the preferred embodiment of FIG. 2, the displacement transducer means designated by the overall reference numeral 10, a final or output stage 12, a brushless DC rotary motor 14 with opto-electronic probe and a monitoring circuit 13 for performed steps are provided.

Means 10 is equipped with an opto-electronic transducer 15 which in the represented embodiment comprises three light transmitter - light receiver pairs 18, 21; 19, 22; and 20, 23 and a diaphragm 16 driven by the motor. The diaphragm 16 is for ease of reference shown in FIG. 2 on the one hand as a whole located on motor shaft 17 and on the other hand in schematic partial view between the light transmitter - light receiver pairs. Each of the light transmitter - light receiver pairs has a light-emitting diode 18, 19 or 20, as well as a phototransistor 21, 22 or 23.

Figure 6:
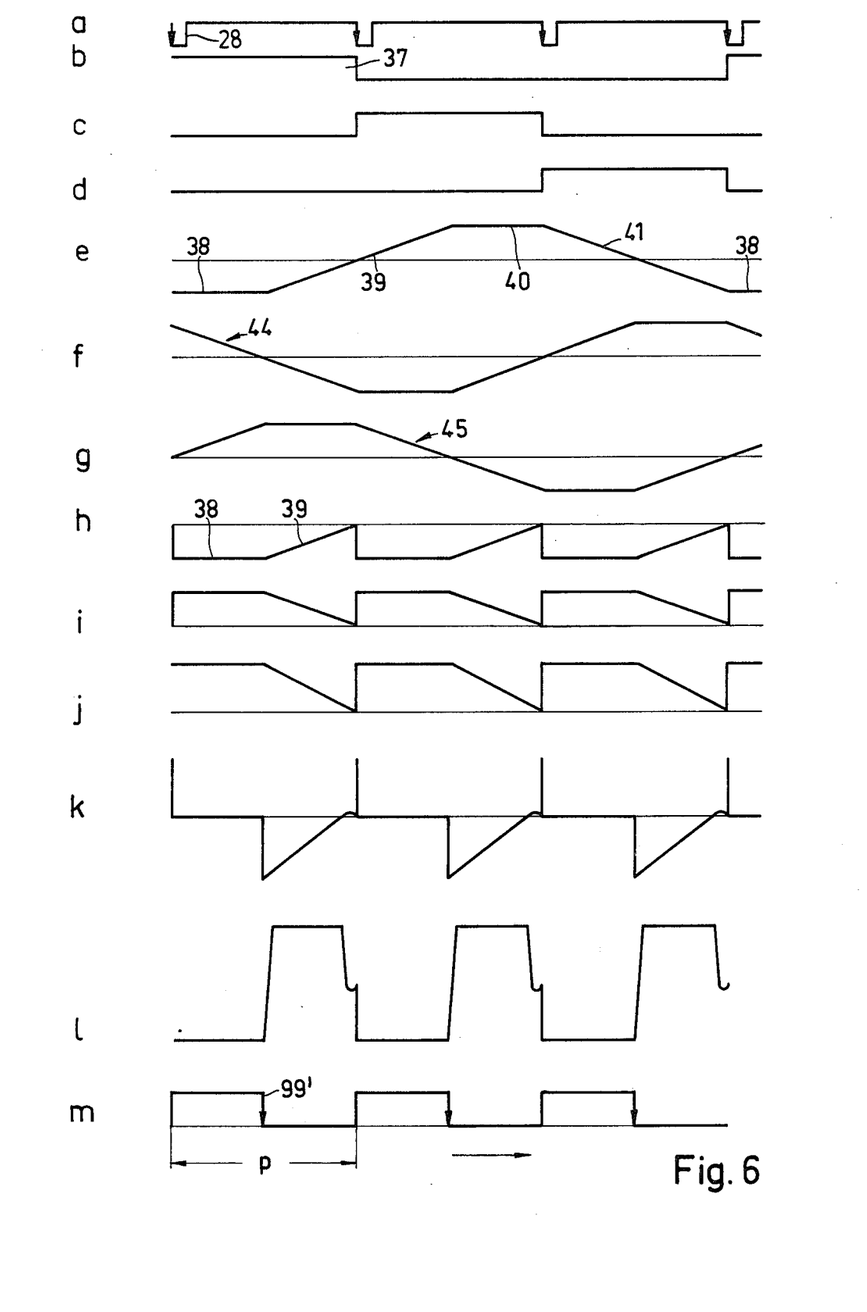
FIG. 6 wave shape of signals occurring in the system according to FIG. 2.

Diodes 18, 19, 20 are switched on and off by selector circuit means, here a shift register 25 (phase transducer) operated as a ring counter at the speed of the desired stepping sequence. During the transition from one to the next desired solution, during each step one diode is switched on while the two other diodes are blocked. Selection and blocking of the diodes alternate cyclically (FIGS. a, b, c, d), by applying a suitable right-left signal to a line 26 either the sequence 18, 19, 20, 18 or 18, 20, 19, 18 can be selected. The step-initiating pulses 28 (FIG. 6a) which trigger the passage from one to the next desired position are supplied to the shift register 25 via a line 27.

Figure 3:
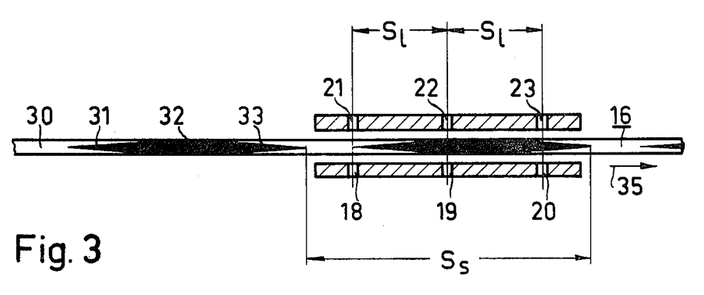
FIG. 3 is a schematic partial representation of an opto-electronic displacement transducer.

In accordance with the embodiment of FIG. 3 the light-transmitter - light receiver pairs can form a point or slit-shape beam path, and in the movement direction of the diaphragm 16 can be displaced from one another by a distance $S_1$ corresponding to the formula $S_1 = p(1+3n)$, wherein p stands for the step angle and n is a random integer. The diaphragm 16 thereby has a track cooperating with all three light transmitter-light receiver pairs whose graduation corresponds to three times the value of step angle p, i.e. the brightness-darkness sequence of the diaphragm is repeated in intervals $S_s = 3xp$. A bright zone 30 corresponding to the angle $p/2$ is thereby followed by a neutral wedge 31 of width p which constantly becomes darker. Neutral wedge 31 is followed by a dark zone 32 of width $p/2$ which in turn followed by a neutral wedge 33 which becomes constantly brighter and whose width once again corresponds to step angle p. The brightness-darkness distribution is then repeated cyclically.

The direction of movement of diaphragm 16 is dependent on the rotation direction of motor 14, which is in turn determined by the signal applied to line 26. For explanation purposes it is assumed that the diaphragm in FIG. 3 moves in the direction of arrow 35. If for example diode 18 by applying voltage 37 (FIG. 6b) is caused to emit light the phototransistor 21 initially emits a negative signal 38 in the relative position of FIG. 3 (FIG. 6c) because between diode 18 and phototransistor 21 is located bright zone 30 and correspondingly transistor 21 carries current. The output signal level of transistor 21 remains constant until after a rotation of diaphragm 16 by angle $p/2$ the neutral wedge 33 following bright zone 30 is reached. During the passage of neutral wedge 33 the light incident on phototransistor 21 constantly decreases. The collector voltage of transistor 21 constantly increases (edge 39 in FIG. 6c). If it is assumed that diode 18 remains activated, the output voltage of transistor 21 increases until, after a rotation angle of p, dark zone 32 is reached. Subsequently the output voltage of transistor 21 remains constantly at the level 40 in FIG. 6e for a rotation of diaphragm 16 about angle p/2. During the passage of neutral wedge 31 it again fails to output value 38 within a rotation angle p (edge 41). The same applies regarding the light transmitter - light receiver pairs 19, 22 and 20, 23 with the exception that their output signals 44 or 45 are in each case displaced by a rotation angle corresponding to step angle p (FIGS. 6f and 6g).

Since, however, in practical operation, diodes 18, 19 and 20 do not remain constantly switched on but are successively activated at the speed of the stepping sequence (FIGS. 6b, 6c and 6d), the output signal of the displacement transducer at point 46 for the rotation direction of motor 14 indicated by arrow 35 in FIG. 3 corresponds to the representation of FIG. 6h, i.e. only the constant negative portion (38 in FIG. 6e) and the following half of the rising edge (39 in FIG. 6e) of the three partial signals are utilized (FIGS. 6e, 6f and 6g).

To permit motor 14 to perform steps of the other direction, i.e. opposite to arrow 35 starting from the diaphragm position in FIG. 3, the diode 19 is firstly switched on followed by diode 18, then diode 20, then diode 19 again and so on. In such a case, a signal of the type shown in FIG. 6i appears at point 46. As can be seen, in each ase the constant positive predetermined value and the following decreasing half of the edges of the partial signals according to FIGS. 6e, 6f and 6g thereby become effective.

Via branch 48 (FIG. 2) a proportional portion of the displacement transducer output signal is applied to the inverting input of an operational amplifier 52. Via a branch 55 the same signal is differentiated. Correspondingly a differential portion of the displacment transducer signal is additionally superimposed on one input of operational amplifier 52. The output signal of the operational amplifier 52 resulting from the proportional portion is shown in FIG. 6j for the assumed rotation direction (arrow 35) and the output signal based on the differential portion in FIG. 6k.

The output of operational amplifier 52 is connected with the input of final or output stage 12 via a switch 58.

The final stage 12 has two power amplifiers 63, 64 whereof one is located in each of the two phases 66, 67 of the brushless DC motor 14, which are staggered by 90° relative to one another. The motor rotor is indicated as 68. A field-effect transistor 70 is connected in front of the inverting input 71 of amplifier 63, while the non-inverting input 72 of amplifier 63 can be connected to zero potential by means of a FET 73. In corresponding manner field-effect transistors 75 and 76 are associated with the inverting input 77 and the non-inverting input 78 of amplifier 64.

A diaphragm 80, having a dark zone extending over an angle of 180°, which is used for commutation purposes is located on motor shaft 17. Diaphragm 80 moves in the beam path between a first lamp 82 and an associated phototransistor 83, as well as a second lamp 84 with an associated phototransistor 85. Lamp 84 and phototransistor 85 are staggered by 90° relative to lamp 82 and phototransistor 83. Phototransistors 83, 85 are located in the control circuit of field-effect transistors 75, 76 and 70, 73, respectively.

The arrangement functions as follows:

To set the drive step motor operation the input of final stage 12 is connected via switch 58 with the output of operational amplifier 52. A signal determining the desired direction of rotation is applied to line 26, e.g. a signal on the basis of which the diaphragm 16 in FIGS. 2 and 3 moves to the right. Step initiating pulses 28 according to FIG. 6a, enter via line 27. It is assumed that in response to the first pulse diode 18 is caused to emit light. At this time, according to FIG. 3, bright zone 30 is located between diode 18 and phototransistor 21. The voltage at point 46 declines. A signal (FIG. 6j) with a constant level appears at the output of operational amplifier 52. As, in the operation stage shown in FIG. 2, both phototransistors 83, 85 of the communication arrrangement are subject to light action, all four field-effect transistors 70, 74, 75 and 76 are cut off. The two power amplifiers 63, 64 are switched to non-inverting operation. The signal from operational amplifier 52 reaches phases 66, 67 in amplified form, whereby amplifiers 63, 64 are driven hard. As the voltage at point 46 is constant during the passage of bright zone 30, the differential signal is equal to zero. Therefore the motor is subject to the action of the full driving current (FIG. 6l) and is accelerated with the maximum available output as shown at 88 in the representation of the angular velocity of motor shaft 17 as a function of time in FIG. 7.

When diaphragm 16 has rotated by angle p/2 the voltage at point 46 starts to rise toward zero level (edge 39 in FIG. 6h) because neutral wedge 33 allows less and less light to pass from diode 18 to phototransistor 21.

Consequently the proportional portion of displacement transducer signal decreases while the differential portion jumps to a maximum value. The differential portion having an opposite polarity to the proportional portion rises above the latter so that the resulting signal at the output of operational amplifier 52 changes sign. Corresponding to FIG. 6l, the power amplifiers 63, 64 are drive to the limit in the direction opposite to the acceleration phase. Motor 14 is braked with full power (branch 89 in FIG. 7). It is only just before reaching the next desired position that the drive changes over to controlled operation and motor 14 is drawn into the desired position in controlled manner. If the next step initiating pulse 28 now appears, the above-described cycle is repeated with the exception that in place of diode 18, diode 19 is now selected and phototransistor 22 is activated. During the next step diode 20 is selected, whereupon the cycle commences again with diode 18.

If motor shaft 17 has rotated to such an extent that the dark zone 81 of diaphragm 80 has become positioned between lamp 84 and phototransistor 85, the two field-effect transistors 70, 73 are driven hard. The non-inverting input 72 is connected to ground (zero potential) and the signal from operational amplifier 52 passes to the inverting input 71. The commutation for the remaining quadrants of the angular position of motor shaft 17 takes place in corresponding manner.

The monitoring circuit 13 has the function of delivering a "step performed" signal to a line 90 as each step is performed. It comprises an operational amplifier 92 connected as a Schmitt trigger, inverters 93, 94, 95, NAND circuits 96, 97, 98 and a flip-flop circuit 99. The inverting input of operational amplifier 92 is connected to the output of operational amplifier 52.

If it is assumed that the signal applied to line 26 which determines the rotation direction is 1 and the signal at the inverting input of amplifier 92 is smaller than the Schmitt trigger threshold voltage, then the output of inverter 93 is at 0, whereas the output of the NAND circuit 96 is 1. The signal 0 appears at the output of inverter 95 and the signal 1 at the output of inverter 94. Consequently the output of NAND circuit 97 is 1 and the output of NAND circuit 98 is 0. If following a pulse 28 the input of amplifier 92 jumps to a voltage located above the Schmitt trigger threshold voltage, the signal 1 appears at the output of inverter 93. The output of NAND circuit 96 jumps to 0 while that of NAND circuit 98 passes to 1, as shown by the representation of the signal at line 90 in FIG. 6m.

After rotation by an angle p2, the signal at the inverting input of operational amplifier 92 again drops below the Schmitt trigger threshold voltage due to the differential portion of the displacement transducer signal so at the output of NAND circuit 98 jumps from 1 to 0. This negative edge designated by 99 in FIG. 6m can be used on line 90 as a signal for further control purposes. As illustrated by FIG. 2, line 90 is connected with the input (reset input) of a slope-controlled RS flip-flop circuit 99 whose output input (set input) is connected to line 27. The flip-flop circuit is set by the leading edge of the pulse on line 27 which triggers the step and is reset by the trailing (negative-going) edge of the signal reaching line 90. In this way each pulse applied to line 91 signifies that a step is performed.

If switch 58 is placed in the position shown in FIG. 2, the input of final stage 12 is connected to a control voltage $U_{ST}$ and the motor runs as a controllable DC motor.

If line 91 is connected to line 27 the system can function as an automatically controlled step motor with switch 58 in the step motor operation position. No external step initiating pulses have to be supplied via line 27. If, however, switch 58 assumes the position shown in FIG. 2, the optical rotary field "load" produced by displacement transducer 15 is continuously indexed "idly" in synchronism, with the rotation of motor shaft 17. As a result it is possible to switch synchronously from DC motor operation to step motor operation and vice versa without fault step indication.

Figure 4:
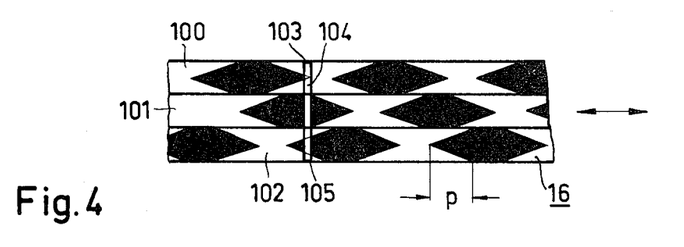
FIG. 4 is a modified embodiment of the displacement transducer.

FIG. 4 schematically shows a modified embodiment of the displacement transducer wherein the diaphragm has three juxtaposed tracks 100, 101, 102 with each of which is associated a light transmitter - light receiver pair. The light transmitter - light receiver pairs shown schematically as 103, 104, 105 can be mutually aligned perpendicular to the direction of movement of the diaphragm if the brightness-darkness distribution of tracks 100, 101, 102 is reciprocally displaced by an amount corresponding to the value of stepping angle $p$ in the manner shown. As compared with the embodiment of FIG. 3, the solution of FIG. 4 has the advantage that it is only necessary to change the diaphragm for changing the number of steps per motor revolution.

Figure 5:
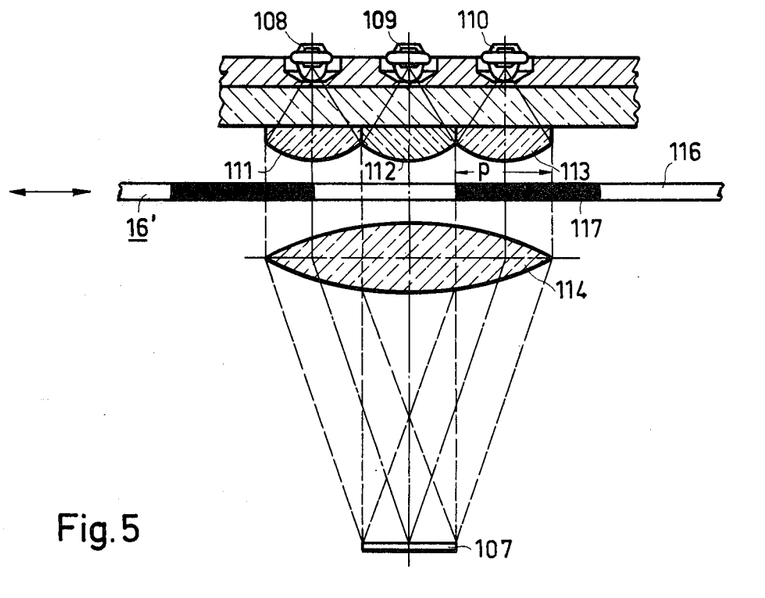
FIG. 5 is a schematic sectional view of a further embodiment of part of the displacement transducer.

FIG. 5 shows a further embodiment of the displacement transducer, whereby a single light receiver 107 is provided with successively cooperates with three light transmitters 108, 109, 110. By means of suitable lenses 112, 113, 114 it is ensured that the beam of each of these light transmitters has a width corresponding to step angle $p$. The associated diaphragm 16' is equipped with a sequence of alternating bright zones 116 and dark zones 117 whose width in each case corresponds to 1.5 times the step angle $p$. This embodiment is particularly suitable for small step angles. A particularly large number of steps per revolution is possible if Moire discs (not shown) are used. In this case a fixed diaphragm is in per se known manner positioned between light transmitter and light receiver in addition to the moving diaphragm 16 or 16'.

Furthermore, diaphragms 16 or 16' and 80 can be combined into a single diaphragm. Neutral wedges 31, 33 can, for example, be embodied in line gratings wherein the brightness-darkness ratio varies continuously.

Trimmer resistors 120, 121, 122 in the feed circuit of diodes 18, 19, 20 make it possible to match the light transmitter - light receiver pairs to one another. The rest position of motor shaft 17 is adjusted by means of a potentiometer 124 (FIG. 2). By regulating a trimmer resistor 123 and/or a trimmer resistor 125 in the input or feedback circuit of the operational amplifier 52 the ratio of the proportional portion and the differential portion can be adjusted so as to ensure the desired oscillation behavior of the control system.

Figure 8:
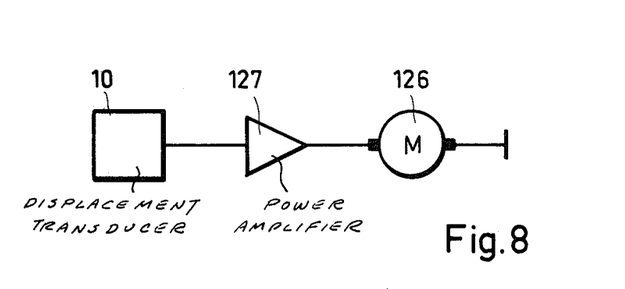
FIG. 8 schematic diagram of a further embodiment of a system wherein the motor is a commutator motor.

Obviously the explained manner of regulation is not restricted to commutatorless DC motors. For example, according to FIG. 8 a commutator motor 126 can be connected to the output of control 10 via a power amplifier 127.

If the operational amplifier 52 is itself designed as a power amplifier, it is unnecessary to supply a separate power amplifier 127.

Figure 11:
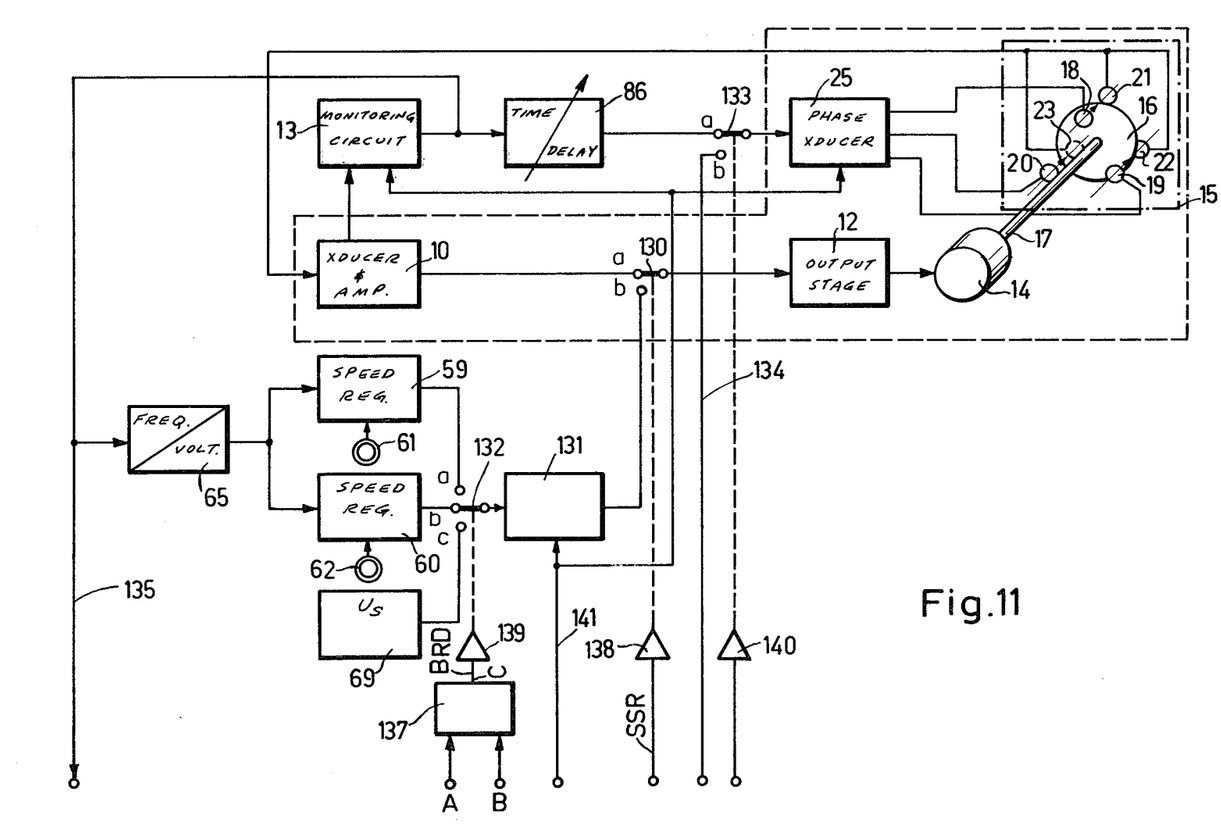
FIG. 11 is a block diagram of a modified embodiment of a drive forming a positioning system.

In practice the problem frequently occurs at transferring within a minimum time from a starting position to a target position removed from the starting position by a plurality of steps. An example of this is a recording head drive for recording mechanisms. Arrangements suitable for such applications are shown in FIGS. 9 and 11.

Figure 9:
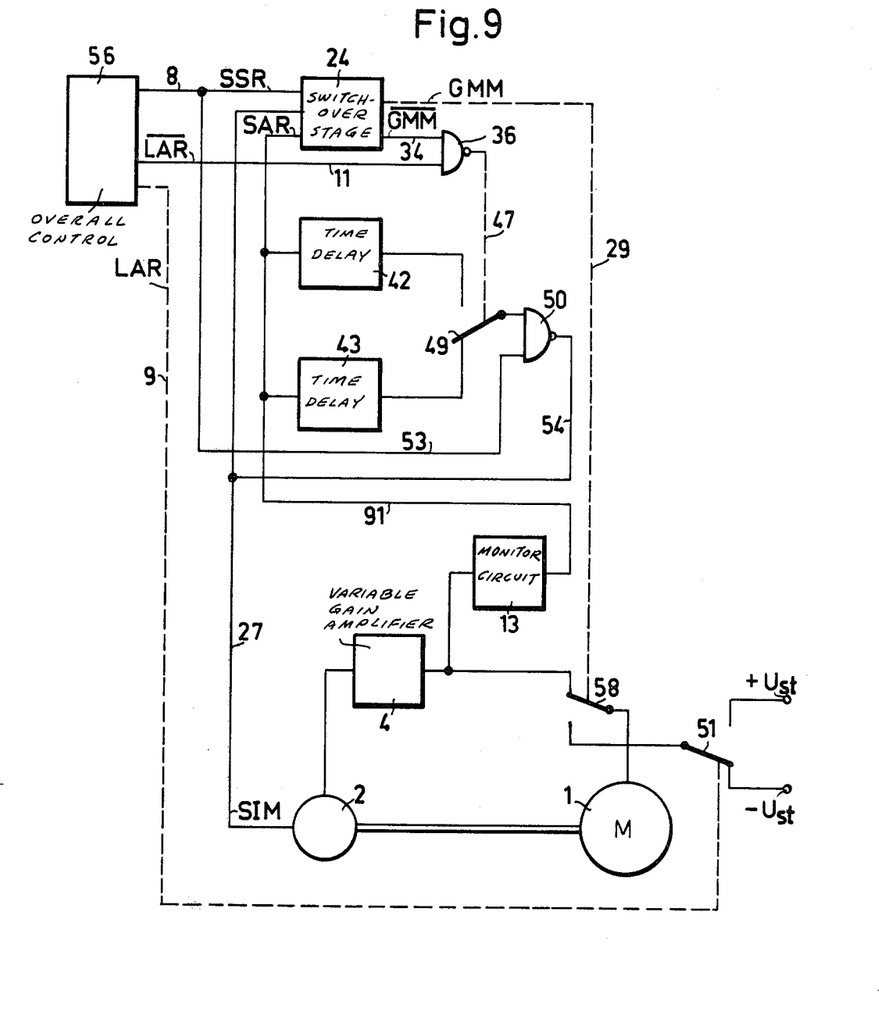
FIG. 9 is a block diagram of a drive constructed as a positioning system.

In the embodiment according to FIG. 9 the motor 1 is, for example, a brushless DC motor, which in accordance with FIG. 1 is connected to the displacement transducer means 2, which in turn is connected to a variable gain amplifier 4. The variable gain amplifier 4 represents a combination of components 5, 6 and 7 of FIG. 1 or amplifier 52 with its input circuits and unit 12 of FIG. 2, and forms together with motor 1 and the displacement transducer means 2, a closed position control circuit when switch 58 positioned in the connecting line from the variable gain amplifier 4 to motor 1 assumes the position shown in FIG. 1. In this position the drive operates as a step motor to which are supplied step commands SIM (FIG. 10d) via a line 27. In the other switching position of switch 58 the control system is opened. A control voltage $+U_{st}$ or a control voltage $-U_{st}$ is applied to motor 1 via a changeover switch 51. It is thereby accelerated ($+U_{st}$) or braked ($-U_{st}$) like a normal DC motor.

Figure 10:
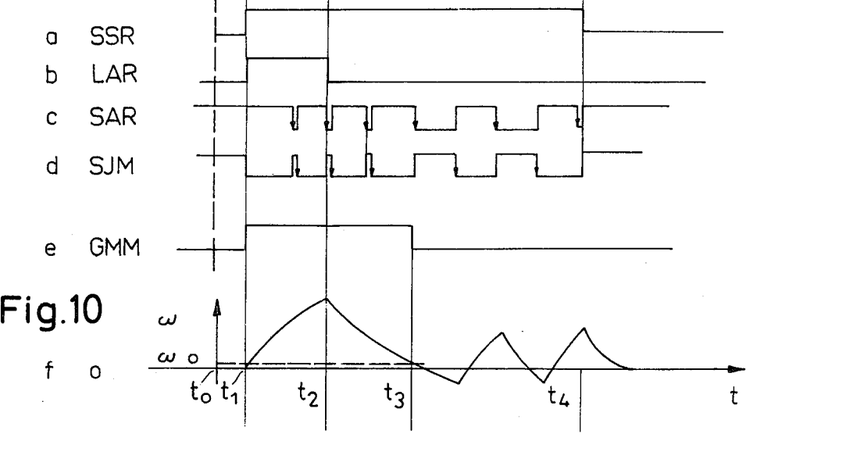
FIG. 10 is a schematic representation of different signals occurring with the arrangement of FIG. 9 as well as the motor speed as a function of time.

The drive can be controlled from a stage 56 which can be a counter, processor or computer. Stage 56 supplies signals SSR (FIG. 10a), LAR (FIG. 10b) and $\overline{LAR}$ to lines 8, 9 and 11 respectively. A monitoring circuit 13 is connected to the output of variable gain amplifier 4. This circuit responds to steps performed by motor 1 independently of whether the motor runs in position-controlled manner as a step motor or in position-uncontrolled manner as a DC motor. It supplies a corresponding step performed signal, hereinafter called SAR signal for short (FIG. 10c) to line 91. Line 91 is connected with the inputs of two time delay stages 42, 43 and the input of a switchover triggering stage 24. Two further inputs of the switching triggering stage 24 are connected to lines 8 and 27. The switchover triggering stage 24 supplies a GMM signal (FIG. 10e), which controls switch 58 via a line 29.

The complementary signal $\overline{GMM}$ of switchover triggering stage 24 passes via a line 34 to one input of a NAND circuit 36 whose output input is connected to line 11. The output of the NAND circuit 36 controls a switch 49 via a line 47 which in one switching position connects the input of a NAND circuit 50 to the output of time delay stage 42 and in the other switching position to the output of time delay stage 43. The other input of NAND circuit 50 is connected via a line 53 to line 8 while the output of NAND circuit 50 is connected via a line 54 to line 27.

Switches 49, 51 and 58 are electromechanical or electronic switches of known type.

The drive of FIG. 9 functions as follows:

In the inoperative position of the drive ($t_0$ to $t_1$ in FIG. 10) signals SSR, LAR and GMM are 0 while $\overline{GMM}$ is 1. Switches 49, 51, 58 are in the switching position shown in FIG. 9 and motor 1 is in the starting position.

If at time $t_1$ stage 56 applies start-stop signal SSR of level 1 to line 8 (starting order), the signal GMM on line 29 jumps to 1 (DC motor operation order). Switch 58 is brought into the lower switching position in FIG. 9. Simultaneously stage 56 applies the LAR signal (running order) via line 9. Switch 51 connects motor 1 with control voltage $+U_{ST}$. Motor 1 is accelerated as a DC motor. Its angular velocity ω rises in accordance with FIG. 10f. As the signals $\overline{LAR}$ and $\overline{GMM}$ on lines 11 and 34 respectively, are now both 0, the output of the NAND circuit 36 jumps to 1. Switch 49 passes into the upper switching position in FIG. 9, in which time delay stage 42 is connected to the input of NAND circuit 50. The SAR signals of the circuit 13 are passed to line 27 in the form of step commands SIM with the time lag determined by stage 42 via switch 49, NAND circuit 50 and line 54. The displacement transducer means 2 is switched synchronously with motor 1. This circuitry makes it possible at any time to pass from DC motor operation to step motor operation without the drive dropping out of synchronism. The time delay of stage 42 is adequate for giving decision stage 56 time for the decision where motor 1 is to be swiched over from acceleration to braking following each SAR signal and prior to applying the next step command SIM to line 27.

If the decision stage recognizes that braking is to commence ($t_2$ in FIG. 10), for example by counting out the number of steps to be covered before reaching the target position during which the drive can be reliably stopped, signal $\overline{LAR}$ goes to 1. Thus, via NAND circuit 36, line 34 is connected to the control line 47 of changeover switch 49. Signal LAR jumps to 0. The changeover switch is brought into the lower switching position in FIG. 9 via line 9. By means of switches 51 and 58 control voltage $-U_{ST}$ is applied to motor 1. This polarity inversion of the motor voltage means that motor 1 is braked as a DC motor (FIG. 10f).

The switchover triggering stage 24 responds (time $t_3$ in FIG. 10) and sets the GMM signal to 0 when the time between the occurrence of a step command SIM on line 27 and the appearance of a SAR signal on line 91 has reached a predetermined maximum value. This time is dependent on the instantaneous angular velocity of motor 1. The value bringing about the operation of stage 24 is selected in such a way that it corresponds to a motor speed $ω_0$ (FIG. 10f), the cut-out speed which is sufficiently low to permit a trouble-free transfer from DC motor operation to step motor operation.

The GMM signal which jumps to 0 brings switch 58 into the upper switching position in FIG. 9 via line 29. The position control circuit is closed. The drive is switched over to step motor operation. As simultaneously the $\overline{GMM}$ signal (line 34) changed to 1, the output of NAND circuit 36 jumps to 0. Via control line 47 changeover switch 49 is brought into the lower switching position in FIG. 9. As a result, the following SAR signals pass through the time delay stage 43 so that (via NAND circuit 50 and lines 54, 27) they can be passed on as step initiating signals to the displacement transducer means 2. Stage 43 brings about the time delay necessary for an automatically controlled step motor operation.

If following an SAR signal stage 56 or a further monitoring stage connected therewith recognizes the target point, it is ensured that the motor 1 is stopped within the particular step. The SSR signal of stage 56 passes to 0 (time $t_4$ in FIG. 10). As a result the NAND circuit 50 is blocked via line 53 for the transducer of further SAR signals to the step command input 27. The position of motor 1 is controlled in the target position.

Obviously the representation of FIG. 10 is only schematic so as to show the fundamental operation of the arrangement in question. Generally in practice the duration of the DC motor operation ($t_1$ to $t_3$) is larger than the duration of the subsequent step motor operation ($t_3$ to $t_4$).

In DC motor operation after initial acceleration a more or less constant angular velocity is reached corresponding to the power supplied before switching over to braking takes place.

In the embodiment according to FIG. 11 in addition to stage 10, final stage 12, monitoring circuit 13 for performed steps, motor 14, phase transducer 25 and the opto-electronic displacement transducer 15 with associated diaphragm 16 and light transmitter - light receiver pairs 18, 21; 19, 22; 20, 23 also shown mounted on the motor, a speed regulator is provided which, in the represented embodiment has two speed regulating stages 59, 60 with in each case associated desired speed transducers 61, 62. A frequency voltage transducer 65 connected with the output of circuit 13, derives an actual speed signal from the step performed signals, which acts on the speed regulating stages 59, 60. A control voltage for an unregulated speed can be taken from a control stage 69.

The input of final stage 12 can be connected via an electronic switch 130 as desired to the output of stage 10 for position control, or the output of a rotation direction reversing stage 131, which is in turn connected via an electronic switch 132 with the output of one of the speed regulating stages 59, 60 or stage 69. The output of circuit 13 is also connectable via a variable time delay stage 86, which is substantially the same as stages 42, 43 of FIG. 9, and an electronic switch 133 to the input of the phase transducer 25. In the other operating position of the switch 133, the phase transducer 25 is connected with a line 134 for the supply of external step initiating pulses. A not shown overall control stage, corresponding to decision stage 456 in FIG. 9, which can be constructed as a computer, processor or counter, receives the "step performed" signal via a line 135. Depending on the desired operation switch 132 can be controlled via this overall control stage and a decoder 137, in accordance with the following truth table:

| Input of 137 | | Output of 137 | |
| --- | --- | --- | --- |
| Signals: | A B | C (= BRD) | |
| | 0  0 | Average speed | ($n_1$) |
| | 0  1 | High speed | ($n_n$) |
| | 1  0 | Braking speed | ($n_2$) |
| | 1  1 | (Braking speed) | |

The stages operating switches 130, 132, 133 are designated 138, 139, 140 in FIG. 11.

The arrangement according to FIG. 11 can be operated as a normal step motor corresponding to the operation of the drive of FIG. 2. For this purpose switch 130 is brought into operating position $a$ and switch 133 into operating position $b$. Step commands are supplied externally via line 134 (corresponding to line 27 in FIG. 2) while the desired direction of rotation is given beforehand via a control line 141 corresponding to line 26 in FIG. 2.

If a step command is received via line 134 the optical rotary field rotates in the explained manner by one stage. The position control system 10, 12, 25, 15 moves motor 14 into the next step position. Approximately half way between the start and finish of the step the inclined portion 39 or 41 of path measuring characteristic curve 38, 44 or 45 (FIG. 6) is reached, and the full braking of the motor 14 commences. Simultaneously with the transfer from the horizontal to the inclined portion of the path measuring characteristic curve, the monitoring circuit 13 emits a signal for the performed step. The rotor of motor 14 at this time has only a sufficiently high kinetic energy to reliably pass into the next step position. The speed regulator remains inactive during this operation.

If switch 130 is brought into operating position $b$ the position control means has no influence on the operation of the motor. The latter runs continuously in position-uncontrolled manner in the same way as a normal DC motor. As in the operation as a step motor the monitoring circuit 13 emits a step performed signal on passing from the horizontal to the inclined portion of the path measuring characteristic curve. This is now supplied directly and without a time delay to phase transducer 25 so that in DC operation the optical rotary field is at least a half a step in advance of the motor shaft, but is otherwise in constant synchronism therewith. The frequency voltage transformer 65, which appropriately comprises a monostable multivibrator with series-connected smoothing element, also derives an actual speed signal from the step performed signal, whose frequency is proportional to the motor speed. This actual speed signal is compared in operating positions $a$ and $b$ of switch 132 with the desired speed signal of transducer 61 and 62, respectively, in order to drive the motor with a correspondingly regulated speed via final stage 12. Obviously, if necessary desired speed values can be furnished in more than two stages, the desired speed value can, for example, be selected digitally.

If the desired speed value is selected so high that the amplifier of final stage 12 is constantly overdriven (indicated schematically in FIG. 11 by control stage 69 connected in operation position $c$ of switch 132) the motor runs without speed control at the maximum available power.

For positioning functions in which it is necessary to pass from a starting position rapidly into a target position remote therefrom by a plurality of steps, the mentioned but not shown overall control stage and, if the motor speed is to be regulated in continuous motor operation, the decoder 137 are necessary.

Figure 12:
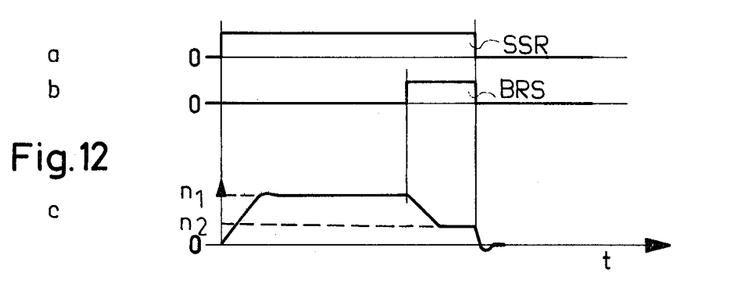
FIGS. 12 and 13 graphs showing the signal wave shapes and speed variations as a function of time, for the embodiment of FIG. 11.

As in the embodiment according to FIG. 9 the drive is started in the starting position by means of a start-stop signal SSR, which brings switch 130 into operating position $b$. Switch 133 is in operating position $a$ (automatically controlled operation), while the decision stage brings switch 132 into operating position $b$ for running at a high regulated speed. The output voltage of frequency voltage transducer 65 is initially virtually zero. Via speed regulating stage 60 the final stage 12 is overdriven in such a way that maximum acceleration of the motor occurs (rising portion of the speed characteristics curve of FIG. 12c). Shortly before reaching the rated speed $n_1$ the output voltage of frequency voltage transducer 65 has risen to a value at which the amplifier of final stage 12 are driven in the linear region. Depending on the setting, the rated speed $n_1$ of motor 14 is reached with greater or lesser overshoot and is then maintained.

Signals indicative of each performed step are constantly furnished via line 135 to overall control stage during the movement of motor shaft 17. At a predetermined number (the so-called braking step number) of steps before the target position, e.g. 15 steps, the decision stage emits a BRS signal (FIG. 12b) whereby switch 132 is brought into position $a$ (low regulated cut-off speed). The amplifiers of final stage 12 are now overdriven in the direction of braking and motor 14 is braked fully. Speed regulation via speed regulating stage 59 only commences just before the regulating cut-off speed $n_2$ (FIG. 12c) is reached. The cut-off speed $n_2$ is just made sufficiently large that motor 14 can stop within half a step in a substantially overshoot-free manner. Under the influence of speed regulating stage 59 motor 14 now runs in regulated manner for about 0 to 3 steps at the low cut-off speed. If, by means of the step performed signals passing over line 135, the decision stage recognizes that the target position will be reached within the particular step, the SSR signal supplied by the decision stage jumps to zero (FIG. 12a). At a time when this step is approximately half performed (transition from horizontal to inclined portion of the particular path measuring characteristic curve), switch 130 is brought into operating position $a$ so that the final half of the last step is performed in position-controlled operation. By differentiation of the SSR signal, the 1 to 0 transition of this signal is utilized to generate an inhibit signal which, when applied to a gate corresponding to NAND circuit 50 in FIG. 9, prevents further step performed signals from being applied to phase transducer 25. The motor then stops in the target position (FIG. 12c).

Figure 13:
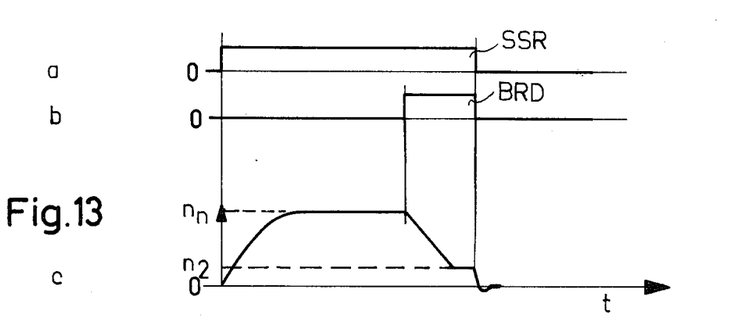

If there is to be no speed regulation of the high speed $n_1$ and the motor is to operate in uncontrolled manner at the available maximum power from the starting position in the direction of the target position (FIG. 13) switch 132 is initially brought into operating position $c$. As the braking step number is a function of the unregulated speed $n_n$ the necessary braking step number must be continually determined from the particular actual speed $n_n$. This can take place in analog or digital manner in the decision stage (e.g. 56, as is for example known from DOS No. 2,246,543).

The invention has been explained hereinbefore relative to rotary drives, but it is obviously also suitable for linear drives.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. System for controlling a motor to execute steps each having a preselected step length, comprising, in combination, displacement transducer means coupled to said motor for furnishing a displacement signal having a constant first predetermined value during motor movement by a predetermined fraction of said step length and changing to a second predetermined value during motor movement by the remainder of said step length; proportional circuit means connected to said displacement transducer means, for furnishing a proportional signal having an amplitude proportional to the amplitude of said displacement signal; differentiating circuit means connected to said displacement transducer means for differentiating said displacement signal and furnishing a differential signal corresponding to the so-differentiated displacement signal; control signal furnishing means connected to said proportional circuit means and said differentiating circuit means for furnishing a control signal varying as a function of both said proportional and said differential signal; and means for applying said control signal to said motor to control the movement thereof.

2. A system as set forth in claim 1, further comprising adjustment means connected to at least a selected one of said proportional circuit means and said differentiator circuit means for adjusting the ratio of said proportional to said differential signal.

3. A system as set forth in claim 1, further comprising amplifier means connected between said control signal furnishing means and said motor in such a manner that full braking voltage is applied to said motor in response to the transition of said displacement signal from said constant first predetermined value to changing towards said second predetermined value.

4. A system as set forth in claim 1, wherein said displacement signal is matched to control said motor to execute said steps at maximum speed.

5. A system as set forth in claim 1, wherein said predetermined fraction of said step length is one-half of said step length.

6. A system as set forth in claim 1, wherein said displacement signal changes from said constant first predetermined value to said second predetermined value as a linear function of motor movement.

7. A system as set forth in claim 1, wherein said displacement transducer means comprise an optoelectronic unit.

8. A system as set forth in claim 1, wherein said system is a system for controlling a motor to execute steps in a first or second direction selectively; and wherein said displacement transducer means comprises means for furnishing a first and second displacement signal having, respectively, a constant first and second predetermined value during motor movement by a predetermined fraction of said step length when said motor moves in said first and second direction respectively and changing to a third predetermined value during motor movement by the remainder of said step length.

9. A system as set forth in claim 8, wherein said displacement transducer means comprises means for furnishing a first and second partial displacement signal displaced relative to each other by said preselected step length, each having said constant first predetermined value for a distance corresponding to said predetermined fraction of said step length, each changing to said constant second predetermined value over a distance corresponding to twice the remainder of said step length, each maintaining said constant second predetermined value for said predetermined fraction of said step length and changing back to said constant first predetermined value over a distance corresponding to twice the remainder of said step length, and selector circuit means connected to said means for furnishing said first and second partial displacement signal, for selecting portions of said first and second partial displacement signal including said constant first predetermined value to constitute said first displacement signal and portions of said first and second partial displacement signal including said constant second predetermined value to constitute said second displacement signal.

10. A system as set forth in claim 1, further comprising amplifier means connected between said control signal furnishing means and said motor for applying full accelerating voltage to said motor before said displacement signal has reached said constant first predetermined value.

11. A system as set forth in claim 9, wherein said means for furnishing said first and second partial displacement signal comprise first means for furnishing said first partial displacement signal and second means for furnishing said second partial displacement signal, each in response to a timing signal; further comprising third means for furnishing a third partial displacement signal identical to said second partial displacement signal and translated therefrom by said predetermined step length in response to a timing signal; and wherein said selector circuit means comprise means for furnishing said timing signals to said first, second and third means in synchronism with said movement of said motor and in a first or a second sequence when said motor moves in said first or said second direction respectively.

12. A system as set forth in claim 11, wherein said displacement transducer means comprise a light transmitter for transmitting a light beam, a light receiver for receiving said light beam, and a diaphragm positioned in the path of light between said light transmitter and said light receiver and driven in synchronism with said motor movement.

13. A system as set forth in claim 12, wherein different diaphragms are utilized for generating different step lengths.

14. A system as set forth in claim 12, wherein said diaphragm transmits varying quantities of light cyclically, each cycle corresponding at least to three times said predetermined step length.

15. A system as set forth in claim 14, wherein said diaphragm has a repeating sequence of bright zones, neutral wedges of increasing darkness, dark zones and neutral wedges of increasing brightness in the direction of movement of said diaphragm, each of said bright and dark zones extending over approximately half of said predetermined step length, each of said neutral wedges extending over approximately one of said predetermined step length.

16. A system as set forth in claim 12, wherein said displacement transducer means comprises a plurality of alternately selectable light transmitters corresponding in number to the number of partial displacement signals.

17. A system as set forth in claim 16, wherein said displacement transducer means comprises a light receiver associated with each of said light transmitters.

18. A system as set forth in claim 17, wherein said displacement transducer means comprises a single light receiver associated with all of said light transmitters.

19. A system as set forth in claim 12, wherein said displacement transducer means comprises a plurality of alternately selectable light receivers corresponding in number to the number of partial displacement signals.

20. A system as set forth in claim 19, wherein said displacement transducer means comprise a common light transmitter constantly furnishing said light beam.

21. A system as set forth in claim 19, wherein said displacement transducer means comprise a plurality of light transmitters corresponding in number to the number of said light receivers; and wherein said light transmitters constantly emit said light beam.

22. A system as set forth in claim 19, wherein said displacement transducer means comprise a diaphragm having a single light controlling track; and wherein said light transmitters are spaced apart from each other in the direction of movement of said track.

23. A system as set forth in claim 16, wherein said diaphragm has a plurality of light controlling tracks; and wherein each of said light transmitters is mounted to cooperate with a corresponding one of said tracks.

24. A system as set forth in claim 19, wherein said diaphragm has a single light controlling track; and wherein each of said light receivers is mounted to cooperate with said track at a predetermined distance from the others of said light receivers in the direction of movement of said track.

25. A system as set forth in claim 19, wherein said diaphragm has a plurality of light controlling tracks; and wherein said light receivers are each mounted to cooperate with a corresponding one of said tracks.

26. A system as set forth in claim 12, wherein said light receiver furnishes a beam having a width corresponding at least to said predetermined step length; and wherein said diaphragm has alternating bright and dark zones each having a width corresponding to one and a half times said predetermined step length in the direction of motion of said diaphragm.

27. A system as set forth in claim 1, wherein said motor is a commutator motor having an electric time constant and a mechanical time constant; and wherein said electrical time constant is substantially smaller than said mechanical time constant.

28. A system as set forth in claim 1, wherein said motor is a linear motor.

29. A system as set forth in claim 1, wherein said motor is a brushless DC motor having an electronic commutating circuit.

30. A system as set forth in claim 29, wherein said motor is a two-phase motor having a first and second phase; further comprising an operational amplifier connected to each phase of said motor, and means for switching each of said operational amplifiers from non-inverting to inverting operation as a function of motor position.

31. A system as set forth in claim 30, wherein said operational amplifier is an analog power amplifier.

32. A system as set forth in claim 30, wherein said operational amplifier is a keyed power amplifier.

33. A system as set forth in claim 12, wherein said motor is a brushless DC motor having an electronic commutating circuit; wherein said commutating circuit includes a diaphragm coupled to said motor for rotation therewith and having a light transmissive region extending over 180° and a light blocking region extending over the remaining 180°, a light transmitter positioned on one side of said diaphragm and a light receiver positioned on the other side of said diaphragm.

34. A system as set forth in claim 33, further comprising a housing for accommodating said diaphragm and said light transmitters and receivers of said displacement transducer means and said commutator means in a single unit.

35. A system as set forth in claim 33, wherein said diaphragm of said displacement transducer means has an additional track for constituting said diaphragm of said commutator means.

36. A system as set forth in claim 11, further comprising monitoring circuit means for furnishing a "step performed" signal indicative of each step moved by said motor.

37. A system as set forth in claim 36, wherein said selector circuit means is responsive to step iniating signals; further comprising means for applying said step performed signals to said selector circuit means to constitute said step initiating signals.

38. A system as set forth in claim 36, further comprising a source of voltage, and selector switch means operable from a first position connecting said source of voltage to said motor to a second position connecting said displacement transducer means to said motor, whereby said motor is switchable from a position controlled step motor operation to a postion-uncontrolled operation while maintaining synchronism between said displacement signal and the position of said motor.

39. A system as set forth in claim 38, wherein said monitoring circuit stage furnishes said "step performed" signal at a point in each step preceding the completion of each of said steps by a predetermined distance.

40. A system as set forth in claim 39, wherein said predetermined distance is about half of said predetermined step length.

41. A system as set forth in claim 40, wherein said selector switch means comprise an electronic switching circuit responsive to a switch-over signal to switch from position-uncontrolled to position-controlled operation.

42. A system as set forth in claim 41, further comprising speed reducing means for reducing the speed of said motor when in position-uncontrolled operation prior to furnishing of said switch-over signal.

43. A system as set forth in claim 42, wherein said motor is operated from a predetermined first to a predetermined second position; further comprising counting means for counting the number of steps performed from said first position and switching said motor from acceleration to braking a predetermined distance preceding said predetermined second position; and wherein said electronic switching circuit includes means for furnishing said switch-over signal when the speed of said motor reaches a predetermined cut-off speed.

44. A system as set forth in claim 43, wherein said selector circuit means are responsive to step initiating signals; wherein said counting means furnish said step initiating signals; further comprising time interval measuring means responsive to said step initating signals and said step performed signals for furnishing said switch-over signals to said electronic switching circuit when the time between one of said step initiating signals and the corresponding one of said step performed signals reaches a predetermined minimum value.

45. A system as set forth in claim 42, further comprising speed regulator means for regulating the speed of said motor selectively to a high speed or a cut-off speed in dependence upon the position of a speed selector switch; wherein said counting means comprise means for furnishing speed selector signals for controlling said speed selector switch upon completion of a predetermined number of steps of motor movement; means for furnishing said step performed signals to said counting means; and wherein said counting means control said speed selector switch and said electronic switching circuit in such a manner that said speed regulator means is switched from said high speed to said cut-off speed and said electronic switching circuit operates to stop the drive in position-controlled manner within a single step.

46. A system as set forth in claim 45, wherein said speed control means comprise means for comparing, selectively, a first or a second desired speed signal to an actual speed signal; further comprising means for furnishing said actual speed signal, said means comprising frequency-voltage transducer means; further comprising means for applying said step performed signals to said frequency voltage transducer means, whereby the voltage output of said frequency voltage transducer means constitutes a measure of the frequency of said step performed signals and thereby of the speed of said motor.

47. A system as set forth in claim 38, wherein said selector circuit means operate under control of step initiating signals; further comprising first and second delay circuit means connected to said monitoring circuit means for furnishing, respectively, first and second delayed step performed signals; and switch means for connecting said first delayed step performed signals to said selector circuit means to constitute said step initiating signals when said motor is operating in a position-controlled mode and for furnishing said second delayed step performed signals to said selector circuit means to constitute said step initiating signals when said motor is operative in a position-uncontrolled mode.

* * * * *